US 7,729,388 B2

(12) United States Patent
Brown et al.

(10) Patent No.: US 7,729,388 B2
(45) Date of Patent: Jun. 1, 2010

(54) PROCESSOR HAVING SPLIT TRANSMIT AND RECEIVE MEDIA ACCESS CONTROLLER WITH REDUCED COMPLEXITY INTERFACE

(75) Inventors: David Allen Brown, Austin, TX (US); Amit Mahendra Shah, Austin, TX (US)

(73) Assignee: Agere Systems Inc., Allentown, PA (US)

( * ) Notice: Subject to any disclaimer, the term of this patent is extended or adjusted under 35 U.S.C. 154(b) by 1846 days.

(21) Appl. No.: 10/799,239

(22) Filed: Mar. 12, 2004

(65) Prior Publication Data

US 2005/0201385 A1    Sep. 15, 2005

(51) Int. Cl.
*H04J 3/26* (2006.01)
(52) U.S. Cl. .................. 370/535; 370/359; 370/389; 370/395.3
(58) Field of Classification Search .................. 370/235, 370/257, 276, 282, 437
See application file for complete search history.

(56) References Cited

U.S. PATENT DOCUMENTS

| | | | | |
|---|---|---|---|---|
| 5,513,320 A * | 4/1996 | Young et al. | ................. | 709/236 |
| 5,790,786 A * | 8/1998 | Wakeman et al. | ........... | 709/249 |
| 6,275,501 B1 * | 8/2001 | Lucas et al. | .................. | 370/463 |
| 6,714,553 B1 * | 3/2004 | Poole et al. | .................. | 370/412 |
| 6,862,265 B1 * | 3/2005 | Appala et al. | ................ | 370/235 |
| 6,873,630 B1 * | 3/2005 | Muller et al. | ................ | 370/356 |
| 6,963,535 B2 * | 11/2005 | Stark et al. | ................... | 370/230 |
| 7,197,045 B2 * | 3/2007 | Amit | .......................... | 370/445 |
| 7,230,957 B2 * | 6/2007 | Kang et al. | .................. | 370/535 |
| 2002/0093970 A1 * | 7/2002 | Amit | .......................... | 370/403 |
| 2003/0185249 A1 * | 10/2003 | Davies et al. | ................ | 370/535 |
| 2005/0201385 A1 * | 9/2005 | Brown et al. | ............ | 370/395.52 |

OTHER PUBLICATIONS

Agere Systems, Product Brief, "Edge/Access and Multiservice Network Processors: APP550 and AP5530," pp. 1-4, May 2003.

* cited by examiner

*Primary Examiner*—Ricky Ngo
*Assistant Examiner*—Ben H Liu
(74) *Attorney, Agent, or Firm*—Ryan, Mason & Lewis, LLP (57) ABSTRACT

A processor includes at least a portion of a first split transmit and receive media access controller (MAC), the split transmit and receive MAC having a transmit unit and a receive unit physically separated from one another. An interface for directing signals between the transmit unit and the receive unit of the first split transmit and receive MAC is configurable to multiplex the signals with other signals directed between a transmit unit and a receive unit of at least a second split transmit and receive MAC. The interface may comprise a plurality of channels, each having one or more ports associated therewith, wherein a given signal to be directed between transmit and receive units of a given split transmit and receive MAC is assigned to a particular channel and port of the interface.

22 Claims, 12 Drawing Sheets

ADDR DECODING FOR CRS FOR FE MAC RX

| CHANNEL ADDR[1:0] | NIBBLE ADDR | [3:0] | BIT 0 | BIT 1 | BIT 2 | BIT 3 |
|---|---|---|---|---|---|---|
| 00 | 0 | CRS_C00_s | CRS_C0P0_s | CRS_C0P1_s | CRS_C0P2_s | CRS_C0P3_s |
| 00 | 1 | CRS_C01_s | CRS_C0P4_s | CRS_C0P5_s | CRS_C0P6_s | CRS_C0P7_s |
| 01 | 0 | CRS_C10_s | CRS_C1P0_s | CRS_C1P1_s | CRS_C1P2_s | CRS_C1P3_s |
| 01 | 1 | CRS_C11_s | CRS_C1P4_s | CRS_C1P5_s | CRS_C1P6_s | CRS_C1P7_s |
| 10 | 0 | CRS_C20_s | CRS_C2P0_s | CRS_C2P1_s | CRS_C2P2_s | CRS_C2P3_s |
| 10 | 1 | CRS_C21_s | CRS_C2P4_s | CRS_C2P5_s | CRS_C2P6_s | CRS_C2P7_s |
| 11 | 0 | CRS_C30_s | CRS_C3P0_s | CRS_C3P1_s | CRS_C3P2_s | CRS_C3P3_s |
| 11 | 1 | CRS_C31_s | CRS_C3P4_s | CRS_C3P5_s | CRS_C3P6_s | CRS_C3P7_s |

ADDR DECODING FOR BkRst FOR 16 FE MAC RX

| CHANNEL ADDR[1:0] | NIBBLE ADDR | [3:0] | BIT 0 | BIT 1 | BIT 2 | BIT 3 |
|---|---|---|---|---|---|---|
| 00 | 0 | BkRst_C00_s | BkRst_C0P0_s | BkRst_C0P1_s | BkRst_C0P2_s | BkRst_C0P3_s |
| 00 | 1 | BkRst_C01_s | BkRst_C0P4_s | BkRst_C0P5_s | BkRst_C0P6_s | BkRst_C0P7_s |
| 01 | 0 | BkRst_C10_s | BkRst_C1P0_s | BkRst_C1P1_s | BkRst_C1P2_s | BkRst_C1P3_s |
| 01 | 1 | BkRst_C11_s | BkRst_C1P4_s | BkRst_C1P5_s | BkRst_C1P6_s | BkRst_C1P7_s |
| 1X | NA | NA | NA | NA | NA | NA |

ADDR DECODER FOR A-N REGISTER INFORMATION

| CHANNEL ADDR[1:0] | NIBBLE ADDR/CTRL | [3:0] | BIT 0 | BIT 1 | BIT 2 | BIT 3 |
|---|---|---|---|---|---|---|
| 00, 01, 10, 11 | 0, 1 | AN_D0_s | TxLreg_s[0] | TxLreg_s[1] | TxLreg_s[2] | TxLreg_s[3] |
| | XData_s | AN_D1_s | TxLreg_s[4] | TxLreg_s[5] | TxLreg_s[6] | TxLreg_s[7] |
| | Xconfig_s | AN_D2_s | TxLreg_s[8] | TxLreg_s[9] | TxLreg_s[10] | TxLreg_s[11] |
| | 0 | AN_D3_s | TxLreg_s[12] | TxLreg_s[13] | TxLreg_s[14] | TxLreg_s[15] |

CONTROL INFORMATION DECODE

| Ctrl[2:0] | CONTROL TYPE |
|---|---|
| 3'b000 | SYNC |
| 3'b001 | CRS |
| 3'b010 | AN_D |
| 3'b011 | FcTxOFF |
| 3'b100 | FI_On |
| 3'b101 | FI_Off |
| 3'b110 | BkRst |
| 3'b111 | RESERVED |

| CLOCK | x+1 | x+2 | x+3 | x+4 | x+5 |
|---|---|---|---|---|---|
| M_DATA[4:0] | 5'b001_00 | 5'b0_1010 | 5'b101_10 | 5'b0_0001 | 5'b000_00 |
| PHASE | CA | DATA | CA | DATA | SYNC |
| DECODED CTRL | CRS | NA | FL_Off | NA | NA |
| CHANNEL ADDR | CHANNEL 0 | NA | CHANNEL 2 | NA | NA |
| NIBBLE A/C | NA | 0 | NA | NA | NA |
| DATA[3:0] | NA | 4'b1010 | NA | 4'b0001 | |
| | | CRS_C00_s | | F0_C20_s | |

EXAMPLE WAVEFORM FOR T/R INTERFACE

FIG. 15

| CLOCK | x+1 | x+2 | x+3 | x+4 | x+5 | x+6 |
|---|---|---|---|---|---|---|
| M_DATA[4:0] | 5'b010_11 | 5'b0_1010 | 5'b1_0010 | 5'b0_1110 | 5'b0_1101 | 5'b000_00 |
| PHASE | CA | DATA | DATA | DATA | DATA | SYNC |
| DECODED CTRL | A-N | NA | NA | NA | NA | NA |
| CHANNEL ADDR | CHANNEL 3 | NA | NA | NA | NA | NA |
| NIBBLE A/C | NA | 0 | XData_s | XConfig_s | 0 | NA |
| DATA[3:0] | NA | 4'b1010 | 4'b0010 | 4'b1110 | 4'b1101 | |
| | | AN_D0_s | AN_D1_s | AN_D2_s | AN_D3_s | |

EXAMPLE FOR A-N INFO ON T/R INTERFACE FOR CHANNEL 3, NIB ADDRESS 0

PROCESSOR HAVING SPLIT TRANSMIT AND RECEIVE MEDIA ACCESS CONTROLLER WITH REDUCED COMPLEXITY INTERFACE

FIELD OF THE INVENTION

The present invention relates generally to network processors or other types of processors, and more specifically to media access controllers (MACs) utilized in such processors.

BACKGROUND OF THE INVENTION

A network processor generally controls the flow of data between a physical transmission medium, such as a physical layer portion of a network, and a switch fabric in a router or other type of switch.

It is often advantageous to configure a network processor to include one or more Ethernet MACs. For example, such MACs can be used to accommodate applications in which an asynchronous transfer mode (ATM) or Internet protocol (IP) network connection needs to be terminated to an Ethernet link.

An Ethernet MAC suitable for supporting Gigabit Ethernet or Fast Ethernet data traffic has two primary functional units, namely, a transmit unit and a receive unit. A typical conventional MAC implementation generally provides a close physical coupling between the two units. More specifically, the two units are usually not physically separated from one another, but are instead located in the same region of a given integrated circuit, also referred to herein as a chip.

The MAC transmit and receive units must interface to application logic that may be located in other regions of the chip. In a given implementation, the MAC application logic interface for Gigabit Ethernet or Fast Ethernet may be, for example, on the order of about 70 bits wide, per transmit and receive side. Because the conventional MAC typically resides in a single location, the entire application logic interface has to be routed from the part of the chip where the MAC is located to the part of the chip where the application logic that connects to the MAC transmit and receive units is located. As the size of the chip increases, this creates a significant problem due to the large number of routes that have to traverse long distances. The problem becomes even worse when there are multiple MACs on a single integrated circuit.

One may attempt to overcome the above-described application logic interface problem by physically separating the MAC transmit and receive units, so that each may be located in proximity to its associated application logic. For example, the transmit and receive units may be placed in opposite corners of the chip. An arrangement of this type is generally referred to as a "split" transmit and receive MAC. Unfortunately, a similar routing problem arises when interfacing the physically-separated transmit and receive units. There are a significant number of signals required in the interface between the transmit and receive units for each Gigabit Ethernet or Fast Ethernet MAC. This interface requirement also makes it impractical to locate MAC transmit and receive units on different chips, since the interface between the units will require an excessive number of input-output circuits. Again, the severity of the problem increases dramatically with the number of MACs that are required in the design.

It is therefore apparent that a need exists for improved techniques for implementing Ethernet MACs in network processor integrated circuits and other applications, so as to reduce the amount of chip resources that are consumed by the MAC interfaces.

SUMMARY OF THE INVENTION

The present invention addresses the above-identified need by providing a processor having one or more split transmit and receive MACs and a reduced complexity interface for directing signals between transmit and receive units of the split transmit and receive MAC(s).

In accordance with one aspect of the invention, a processor includes at least a portion of a first split transmit and receive MAC, the split transmit and receive MAC having a transmit unit and a receive unit physically separated from one another. An interface for directing signals between the transmit unit and the receive unit of the first split transmit and receive MAC is configurable to multiplex the signals with other signals directed between a transmit unit and a receive unit of at least a second split transmit and receive MAC. The interface may comprise a plurality of channels, each having one or more ports associated therewith, wherein a given signal to be directed between transmit and receive units of a given split transmit and receive MAC is assigned to a particular channel and port of the interface.

In accordance with another aspect of the invention, the interface is controllably operable in one of at least two modes including an internal mode of operation and an external mode of operation. In the internal mode, the interface is configured to deliver signals between one or more transmit units and one or more receive units where the transmit units and the receive units are implemented on the same integrated circuit. In the external mode, the interface is configured to deliver signals between one or more transmit units and one or more receive units where the transmit units and the receive units are implemented on different integrated circuits.

In accordance with a further aspect of the invention, the interface comprises a receive interface block coupled to a generate interface block via an interface bus. The generate interface block receives signals from a plurality of MAC receive units and multiplexes the signals onto the interface bus for delivery to the receive interface block. The receive interface block demultiplexes the signals from the interface bus for delivery to appropriate ones of a plurality of MAC transmit units. The receive interface block and the generate interface block preferably operate in accordance with a state machine that has a synchronization state, a control address state and one or more data states.

In an illustrative embodiment, the interface bus comprises a five-bit wide information signal bus and a clock signal line. This reduced complexity interface allows MAC receive and transmit units to be physically separated, on a single integrated circuit or across multiple integrated circuits, without requiring excessive use of routing lines, input-output circuits, or other chip resources. More specifically, the illustrative embodiment allows the receive and transmit units for multiple MACs to be placed on different integrated circuits using a low pin count interface comprising only five data signals and one clock signal.

DETAILED DESCRIPTION OF THE INVENTION

The invention will be illustrated herein in conjunction with an exemplary system for processing data for transmission through a network. The exemplary system includes at least one network processor having one or more MACs configured in a particular manner in order to illustrate the techniques of the invention. It should be understood, however, that the invention is more generally applicable to any processor in which it is desirable to provide a reduction in the resources consumed by interfaces between MAC transmit and receive units.

The term "processor" as used herein may comprise a network processor or any other type of processing device in which one or more split transmit and receive MACs may be implemented. A given processor may also comprise a combination of multiple processors, such as a combination of multiple network processor integrated circuits. A processor may be implemented, by way of example and without limitation, utilizing elements such as those commonly associated with a microprocessor, central processing unit (CPU), digital signal processor (DSP), application-specific integrated circuit (ASIC), or other type of data processing device, as well as portions and combinations of such elements.

Figure 1:
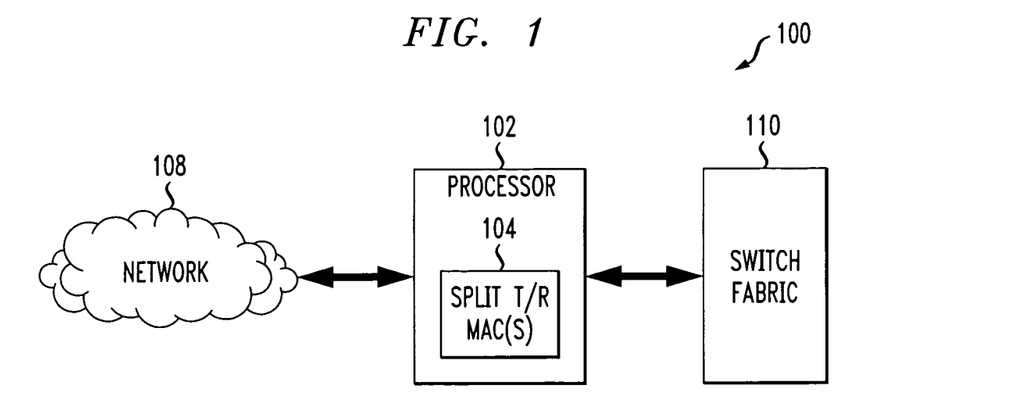
FIG. 1 is a simplified block diagram of an exemplary processing system in which the present invention is implemented.

FIG. 1 shows a network processing system 100 in which the invention is implemented. The system 100 includes a network processor 102 having one or more split transmit and receive (T/R) MACs 104. As indicated above, a split transmit and receive MAC is a MAC in which the transmit unit and the receive unit are physically separated from one another. For example, the transmit and receive units may be on opposite sides of a single integrated circuit, or may be on different integrated circuits. This is in contrast to a typical closely-coupled arrangement, in which these two units are located immediately adjacent to one another. The term "physically separated" as used herein is thus intended to encompass any arrangement other than the immediately adjacent arrangement.

In accordance with an aspect of the present invention, at least one of the one or more split transmit and receive MACs 104 is configured to utilize a reduced complexity interface between its physically separated transmit and receive units. The reduced complexity interface will be described in greater detail below with reference to the illustrative dual-chip embodiment of FIG. 3, and with reference to the additional diagrams of FIGS. 4 through 16.

The network processor 102 may be an otherwise conventional network processor, such as a PayloadPlus® network processor in the APP500 product family, from Agere Systems Inc. of Allentown, Pa., U.S.A., suitably configured to incorporate a reduced complexity interface for one or more split transmit and receive MACs in accordance with the invention.

The processor 102 may be implemented in the form of one or more integrated circuits installed on a line card or port card of a router or switch. In such a configuration, the switch fabric 110 is generally considered to be a part of the router or switch. Numerous other implementations are possible, as will be appreciated by those skilled in the art.

Figure 2:
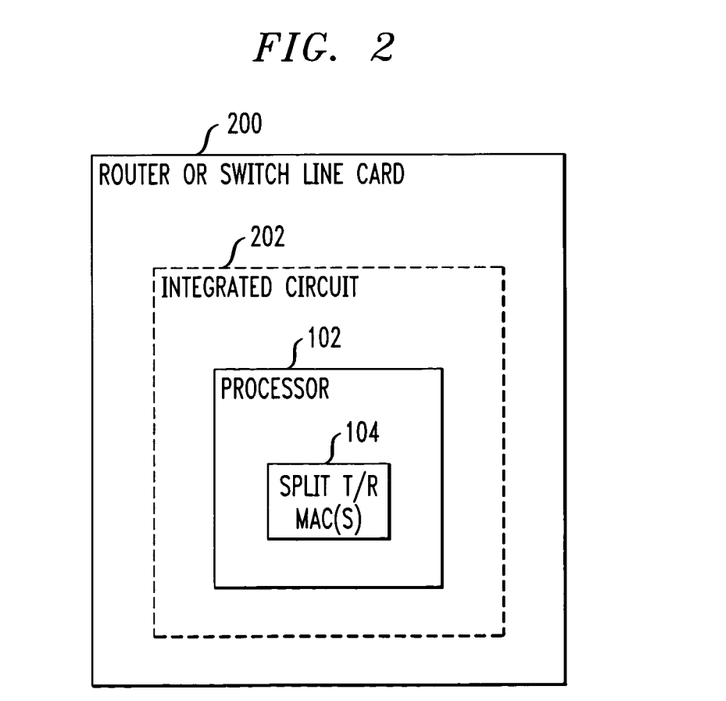
FIG. 2 illustrates one possible implementation of a network processor of the FIG. 1 system as an integrated circuit installed on a line card of a router or switch.

FIG. 2 illustrates an example router or switch line card embodiment of a portion of the system 100 of FIG. 1. In this embodiment, the processing system comprises a line card 200 having at least one integrated circuit 202 installed thereon. The integrated circuit 202 comprises network processor 102. A suitable host processor may also be installed on the line card 200, and used for programming and otherwise controlling the operation of one or more network processor integrated circuits on the line card 200.

The portion of the processing system as shown in FIGS. 1 and 2 is considerably simplified for clarity of illustration. It is to be appreciated, however, that the processing system may comprise a router or switch which includes multiple line cards such as that shown in FIG. 2, and that each of the line cards may include multiple integrated circuits. A similar embodiment may be implemented in the form of a port card. However, the invention does not require such card-based implementation in a router, switch or other element.

It should also be understood that the particular arrangements of elements shown in FIGS. 1 and 2 are by way of illustrative example only. More specifically, as previously noted, the invention can be implemented in any type of processor, and is not limited to any particular network-based processing application.

The system 100 and network processor 102 as illustrated in FIGS. 1 and 2 may thus include other elements in addition to or in place of those specifically shown, including one or more elements of a type commonly found in a conventional implementation of such a system and network processor. For example, the network processor may include a classifier, a scheduler, queuing and dispatch logic, one or more memories, one or more memory controllers, interface circuitry for interfacing the network processor with the network 108, the switch fabric 110, the host processor 112 and other external devices, as well as other conventional elements not explicitly shown in the figure. These and other conventional elements, being well understood by those skilled in the art, are not described in detail herein.

The functionality of the network processor 102 as described herein may be implemented at least in part in the form of software program code. For example, elements associated with the split transmit and receive MAC(s) 104 and the associated reduced complexity interface may be implemented at least in part utilizing elements that are programmable via instructions or other software that may be supplied to the network processor via an external host processor or other suitable mechanism. For example, information characterizing a particular configuration of the MAC(s) or the associated interface may be supplied to the network processor from the associated host processor or other suitable mechanism.

As mentioned previously, the present invention provides a reduced complexity interface for communicating signals between transmit and receive units of one or more split transmit and receive MACs. The transmit and receive units of the split transmit and receive MACs are physically separated from one another. For example, one or more of the transmit units may be implemented in a first region of an integrated circuit and one or more of the receive units may be implemented in a second region of the same integrated circuit, remote from the first region. As another example, one or more of the transmit units may be implemented on a first integrated circuit and one or more of the receive units may be implemented on a second integrated circuit. Numerous alternative types of physical separation between transmit and receive units may be used, as well as combination of such arrangements. As will be described below, the interface in the illustrative embodiments is configurable to multiplex signals that are directed between multiple transmit units and their respective receive units. The term "interface" as used herein is intended to include any arrangement of one or more signal lines or buses suitable for use in multiplexing signals directed between two or more transmit units and their respective receive units.

The transmit and receive units associated with multiple MACs in a given embodiment may be associated with one or more Gigabit Ethernet MACs, one or more Fast Ethernet MACs, or other types of MACs, in any combination. The notation GE, Giga or GMAC will be used herein to refer to Gigabit Ethernet MACs, while the notation FE or FE MAC will be used herein to refer to Fast Ethernet MACs. Although illustrated herein with reference to GE and FE MACs, the invention can be used with other types of MACs, such as, for example, 10 Gigabit MACs.

Examples of signals that may be directed between the transmit and receive units of a given MAC in the illustrative embodiment include the following functional signals:

1. Carrier sense (CRS).
2. Auto-negotiation data and control (AN_D).
3. Flow control through reception of pause frame (FcTx-Off).
4. Transmit flow control frames (FI_On, FI_Off).
5. Deference reset (BkRst).

These and other signals that may be directed between the transmit and receive units of a given MAC are well known to those skilled in the art, and are described in greater detail in one or more of the Gigabit Ethernet and Fast Ethernet specification documents, which are incorporated by reference herein.

The CRS signal in the illustrative embodiment is assumed to be associated with an FE MAC having a serial media independent interface (SMII). This signal may be utilized in both deference logic and late collision logic of the FE MAC. In contrast, an FE MAC with a media independent interface (MII) will generally have a CRS signal that is fed to the deference logic and a collision (COL) signal that is fed to the late collision logic. Thus, if the FE MAC is in SMII mode, the CRS signal is forwarded from the receive unit to the transmit unit, but if the FE MAC is in MII mode, both the CRS and COL signals are forwarded from the receive unit to the transmit unit. As indicated above, the illustrative embodiment assumes the former case, although it is to be appreciated that the invention is not limited in this regard.

It should also be noted that CRS information should generally be passed only in the case of an FE MAC operating in half-duplex mode.

Auto-negotiation information should generally be passed only when a GE MAC is in physical medium attachment (PMA) mode.

Flow control information should generally be passed only when a GE or FE MAC is enabled for flow control.

In the illustrative embodiment, communication between the transmit and receive units of a given MAC can be either internal, in which case the transmit and receive units are located on the same integrated circuit, or external, in which case the transmit and receive units are on different integrated circuits. The split transmit and receive MAC interface in such an embodiment is thus capable of supporting both internal connections as well as external connections between MAC transmit and receive units.

Figure 3:
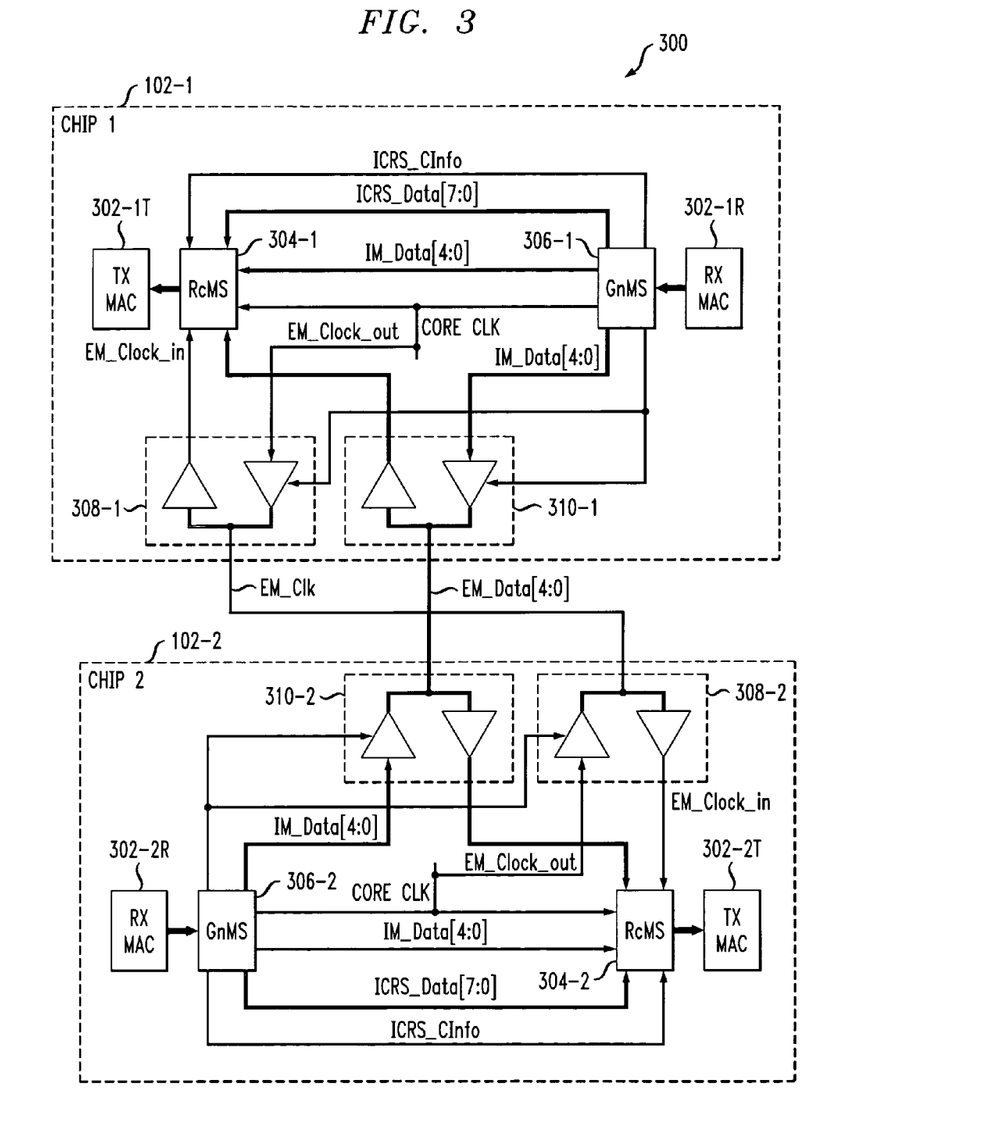
FIG. 3 is a schematic diagram of an illustrative dual-chip embodiment of the invention in which a plurality of MACs are distributed across two network processor integrated circuits.

FIG. 3 shows an exemplary implementation of an embodiment capable of supporting both internal and external connections. A dual-chip arrangement 300 includes a first network processor integrated circuit 102-1, also denoted Chip 1, coupled to a second network processor integrated circuit 102-2, also denoted Chip 2. This arrangement thus includes a plurality of split transmit and receive MACs distributed across two network processor integrated circuits. The distributed MACs include transmit units 302-1T and receive units 302-1R on Chip 1, and transmit units 302-2T and receive units 302-2R on Chip 2.

The reduced complexity interface is implemented using receive MAC split interface blocks 304-1 and 304-2, and generate MAC split interface blocks 306-1 and 306-2. These blocks and their associated signal lines and buffers support both an internal mode (IM) and an external mode (EM) of operation. For example, in an internal mode in which a given MAC transmit unit is in 302-1T of Chip 1 and its corresponding receive unit is in 302-1R of Chip 1, signals directed between the transmit unit and the receive unit pass between the Chip 1 blocks 304-1 and 306-1. As another example, in an external mode in which a given MAC transmit unit is in 302-1T of Chip 1 and its corresponding receive unit is in 302-2R of Chip 2, signals directed between the transmit unit and the receive unit pass between the Chip 1 blocks 304-1 and the Chip 2 block 306-2.

In Chip 1, the internal mode portion of the interface between receive block 304-1 and generate block 306-1 includes a core clock signal line and a signal bus denoted IM_Data[4:0]. Similarly, the internal mode portion of the interface between receive block 304-2 and generate block 306-2 in Chip 2 includes a core clock signal line and an IM_Data[4:0] signal bus. The external mode portion of the interface between Chip 1 and Chip 2 includes a core clock signal line denoted EM_Clk and a signal bus denoted EM_Data[4:0], which are connected between respective bidirectional buffer pairs 308-1, 308-2 and 310-1, 310-2. Other internal mode signal lines that may be used for communicating CRS information for FE MACs operating in half-duplex mode include lines for ICRS_CInfo and ICRS_Data[7:0] signals.

The split transmit and receive MAC interface in the illustrative embodiment organizes the signals from the various MACs into channels. By way of example, a given channel in this embodiment may comprise eight FE MACs, eight GE MACs operating in Gigabit media independent interface (GMII) mode, or two GE MACs operating in PMA mode. Thus, in order to accommodate 32 FE MACs, there would be four channels, each of which may be viewed as comprising eight ports. Each group of four ports can accommodate four FE MACs or four non-PMA GE MACs. The port group is decoded by a nibble address, except in the case of auto-negotiation information transfer. Nibble addresses of '0' and '1' will therefore identify respective first and second four-port groups of a given eight-port channel. More specifically, a nibble address of '0' covers the lower four ports (ports 0, 1, 2 and 3) and a nibble address of '1' covers the upper four ports (ports 4, 5, 6 and 7).

In typical external mode operation, one of the two integrated circuits Chip 1 and Chip 2 may be designated as a "slave" and the other as a "master" with respect to the split transmit and receive interface. Typically, the slave is the integrated circuit which carries the transmit units of the interface, while the master is the integrated circuit that carries the receive units. This external mode interface may be viewed as a source clock interface, in that the integrated circuit sourcing the data also sources a clock. The interface may run at a higher clock frequency that the receive and transmit units. For example, in one implementation it is possible to have the interface run at 266 MHz, while the receive and transmit units operate between 25 and 125 MHz, although numerous other clock frequency arrangements can be used. Operating the interface at the higher frequency generally increases its bandwidth and reduces the latency in sending information from the receive units to the transmit units.

Figure 4:
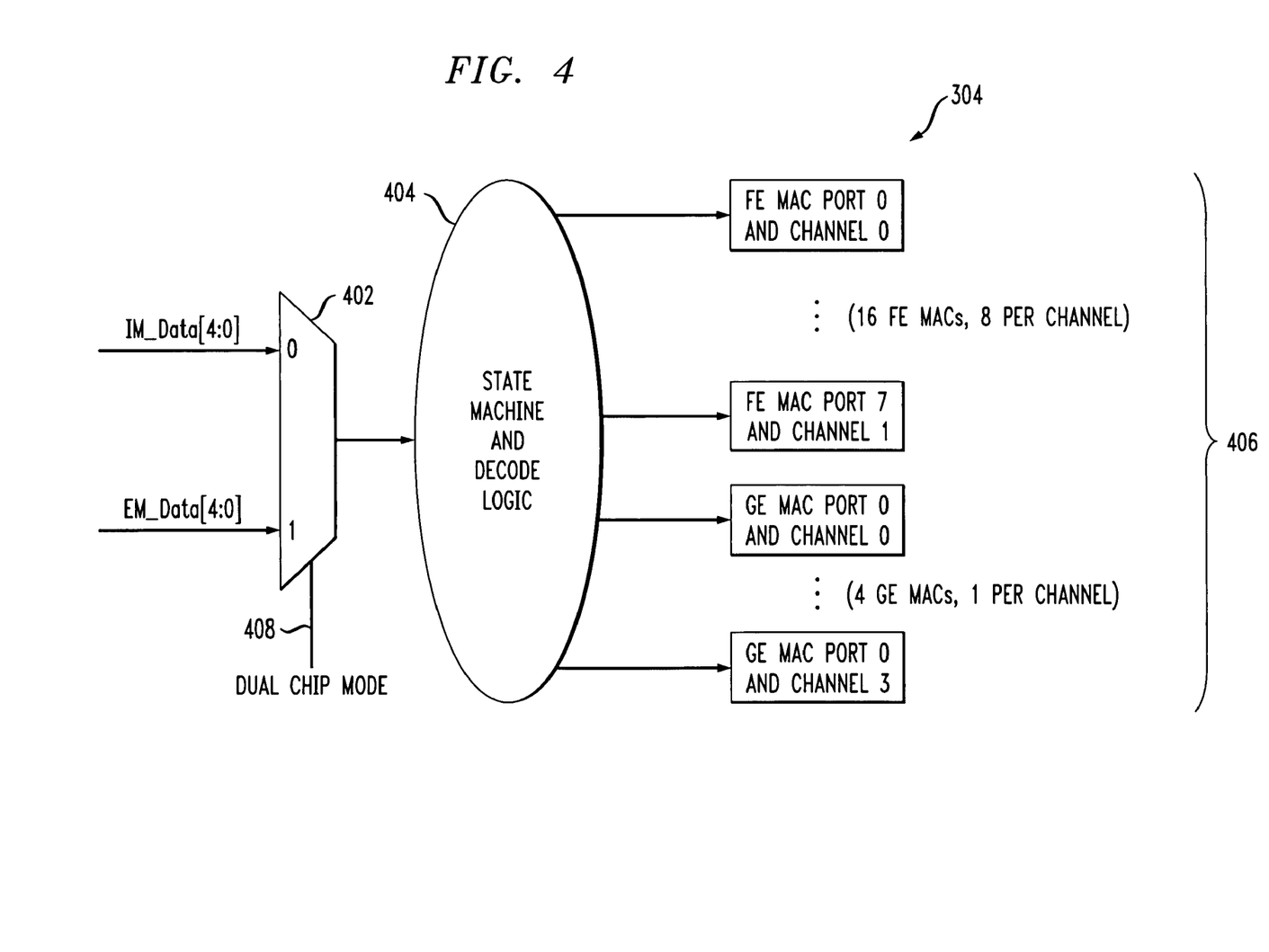
FIGS. 4 and 5 show respective receive interface and generate interface portions of a split transmit and receive MAC interface in an illustrative embodiment of the invention.
Figure 5:
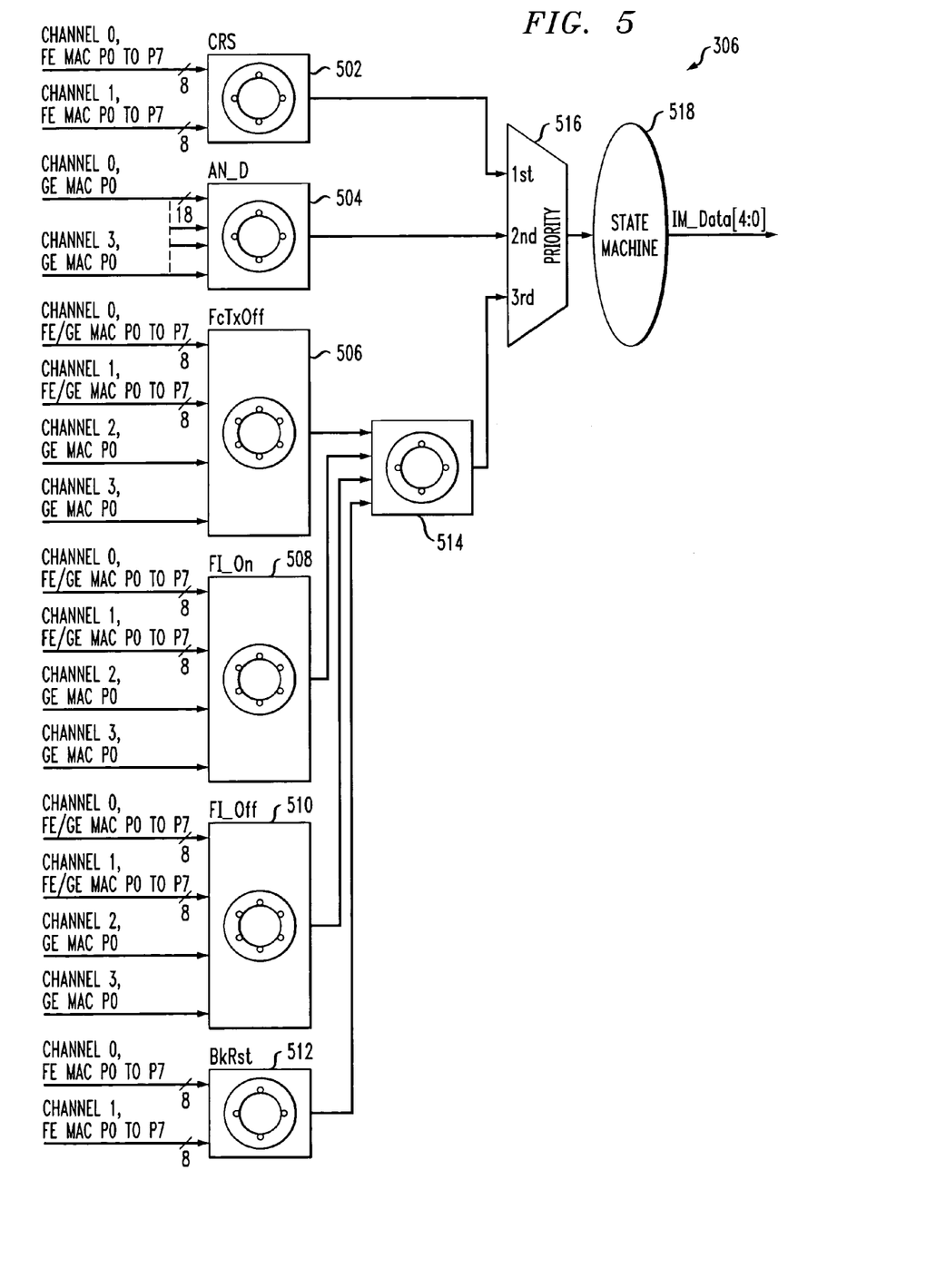

FIGS. 4 and 5 show more detailed views of respective ones of the receive MAC split interface blocks 304 and generate MAC split interface blocks 306. In this example, it is assumed that there are four channels, denoted Channel 0, Channel 1, Channel 2 and Channel 3, and that Channel 0 and Channel 1 are each assigned either eight FE MACs or one GE MAC while Channel 2 and Channel 3 are each assigned one GE MAC.

Referring now to FIG. 4, the receive MAC split interface block 304 includes a multiplexer 402, state machine and decode logic 404, and a plurality of outputs 406, each of the outputs corresponding to a particular one of a plurality of split transmit and receive MACs. Responsive to a dual chip mode control signal applied to input 408, the multiplexer 402 passes either the IM_Data[4:0] internal mode signal bus or the EM_Data[4:0] external mode signal bus to the state machine and decode logic 404. The state machine and decode logic 404 processes the corresponding received signals to generate the appropriate MAC signals for delivery to the MAC transmit units 302-1T or 302-2T. The receive MAC split interface block thus receives the signals associated with either the IM_Data[4:0] or EM_Data[4:0] signal buses, and decodes the corresponding information for routing to the appropriate MACs.

The generate MAC split interface block 306, shown in FIG. 5, gathers the signals from the receive units of the MACs, and generates the signals for the signal bus IM_Data[4:0]. As was previously described in conjunction with FIG. 3, the signals of this signal bus can be routed via an internal receive MAC split interface block 304 to internal transmit units in internal mode. Alternatively, the signals of the IM_Data[0:4] signal bus can be routed via an external receive MAC split interface block 304 to external transmit units in external mode. In the latter case, at the output of a given one of the bidirectional buffers 310-1 or 310-2, the signal bus is relabeled as the EM_Data[4:0] signal bus.

As noted above, the present example includes four channels. As shown in FIG. 5, Channel 0 may be assigned eight FE MACs, corresponding to ports that are denoted Port 0 (P0) through Port 7 (P7). Alternatively, Channel 0 may be assigned one GE MAC, corresponding to a single port denoted Port 0 (P0). Thus, either the FE MACs or the GE MAC may be used, but both cannot be active in a single channel at the same time. Channel 1 is configured to accommodate substantially the same groupings of MACs as Channel 0. Channels 2 and 3 in this example are each assumed to be assigned a single GE MAC, corresponding to a single port denoted Port 0 (P0).

The generate split MAC interface block 306 includes arbiters 502, 504, 506, 508, 510 and 512 for selecting particular ones of the respective CRS, AN_D, FcTxOff, FI_On, FI_Off and BkRst signals for insertion into the interface. The arbiters 502, 504 and 512 are implemented as four-input round-robin arbiters, while the arbiters 506, 508 and 510 are implemented as six-input round robin arbiters, although other types of arbiters or other selection circuitry may be used in other embodiments. It should be noted that each of the 8-bit input signal buses shown in the figure is handled by the associated arbiter as two 4-bit inputs.

The outputs of the four arbiters 506, 508, 510 and 512 are applied to inputs of another four-input round robin arbiter 514. Outputs of the arbiters 502, 504 and 514 are applied to respective inputs of a priority multiplexer 516, which selects particular ones of the inputs for application to state machine logic 518 which utilizes the selected inputs to generate the signals comprising the bus IM_Data[4:0].

The multiplexer 516 may be viewed as a top-level arbiter, which is configured to assign the highest priority to the CRS signals, the second highest priority to the AN_D signals, and the lowest priority to the remaining signals. A round robin technique may be used in selecting among the various signals input to the multiplexer 516.

The CRS signal in SMII mode is assigned the highest priority because it requires a low latency path between the receive and transmit units, as it affects the late collision windows of the FE MACs. Giving the CRS signal highest priority ensures that any change in the CRS signal reaches the transmit unit immediately.

The above-noted ICRS_CInfo signal and ICRS_Data[7:0] bus may be used to further reduce the CRS latency in internal mode. The ICRS_CInfo signal toggles every clock pulse. When ICRS_CInfo is a '0', it means the ICRS_Data[7:0] bus is carrying the CRS signal status of FE MACs in Channel 0, Ports 0 to 7. When ICRS_CInfo is a '1', it means the ICRS_Data[7:0] bus carries the CRS signal status of FE MACs in Channel 1, Port 0 to 7. The ICRS bus is not connected to the bidirectional buffers of the integrated circuits in order to reduce the total number of signals needed for the external mode interface.

In the four-channel example, there may be up to 32 FE MACs. Thus, there may be up to 32 different CRS signals, each associated with one of the FE MACs, and these signals should be synchronized to the core clock signal for transfer.

Figure 6:
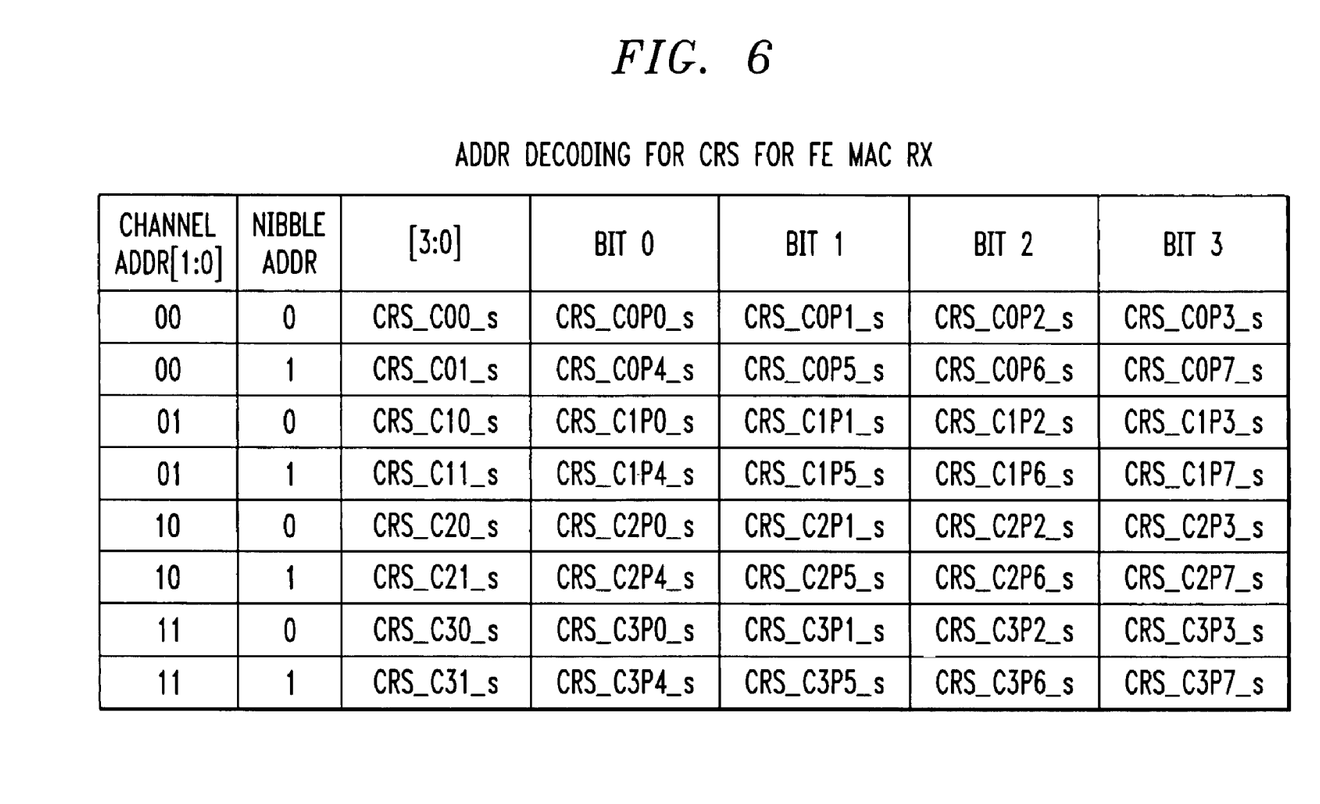
FIGS. 6, 8, 10 and 12 show decoding tables for a split transmit and receive MAC interface in an illustrative embodiment of the invention.

The table in FIG. 6 shows the address decoding for the 32 CRS signals in this example. The signal naming convention is as follows. The four-bit signal CRS_C00_*s* comprises CRS information from FE MACs 0-3 in Channel 0 and Ports 0-3, since the nibble address is a '0'. Similarly, the four-bit signal CRS_C21_*s* comprises CRS information from FE MACs 4-7 in Channel 2 and Ports 4-7, since the nibble address is a '1'. The single-bit signal CRS_C0P4_*s* comprises CRS information from FE MAC 4 in Channel 0 and Port 4. This naming convention is followed for other signals referred to herein in the context of the illustrative embodiment.

Figure 7:
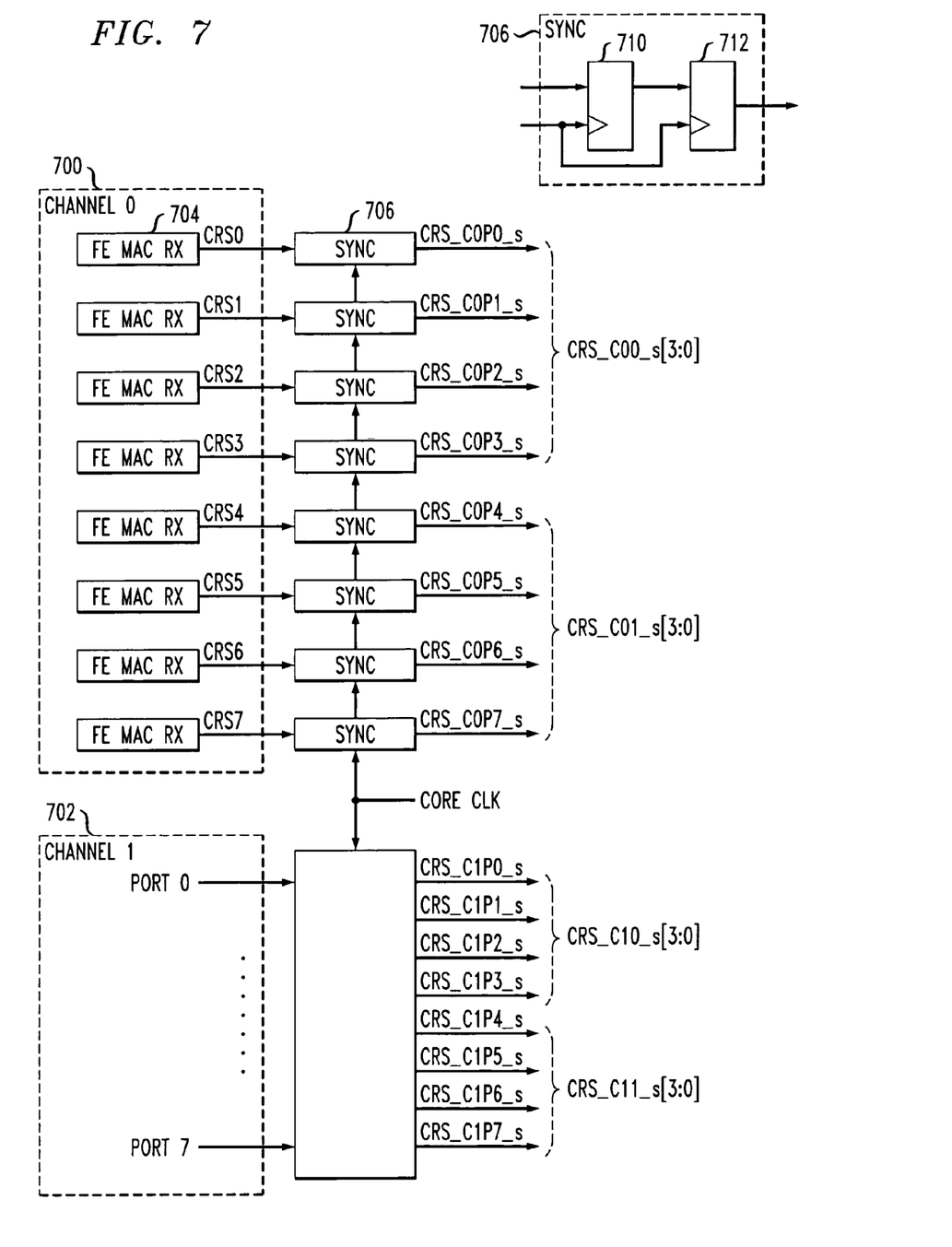
FIG. 7 is a diagram showing assignment of multiple Fast Ethernet MAC carrier sense signals to channels of a split transmit and receive MAC interface in an illustrative embodiment of the invention.

FIG. 7 shows the assignment of 16 FE MAC CRS signals to two channels of a split transmit and receive MAC interface in the illustrative embodiment. First and second sets 700, 702 of FE MAC receive units 704 are assigned to Channel 0 and Channel 1, respectively. The CRS signals CRS0, CRS1, ... CRS7 generated by the FE MAC receive units 704 of Channel 0 are supplied to respective synchronization circuits 706. The CRS signals generated by the FE MAC receive units of Channel 1 are handled in a similar manner. Also shown in the figure is a more detailed view of a given one of the synchronization circuits 706, which includes a series arrangement of first and second flip-flops 710, 712. It is to be appreciated that this particular synchronization arrangement is presented by way of example only, and other techniques may be used.

Figure 8:
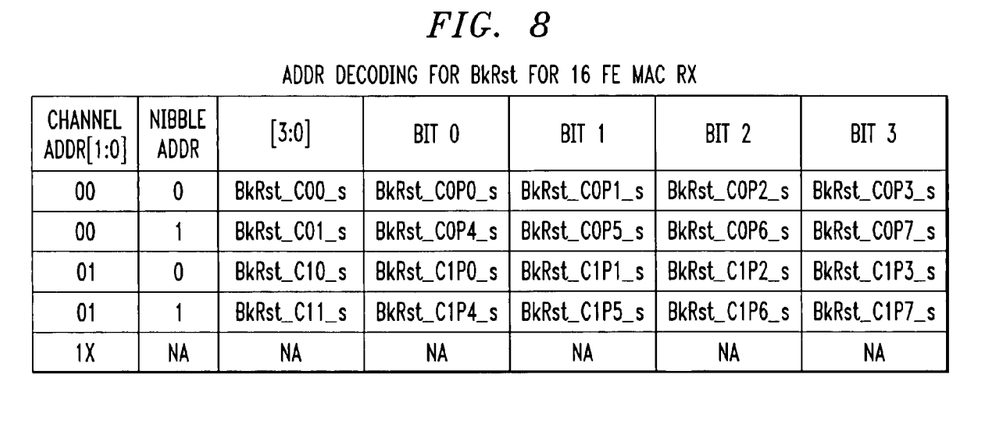

The table in FIG. 8 shows the address decoding for 16 FE MAC BkRst signals.

A MAC receive unit can direct its corresponding MAC transmit unit to stop any new packet transmission by asserting the FcTxOff signal. This mode can be supported by both GE MACs and FE MACs. Address decoding for the FcTxOff signal can be implemented in substantially the same manner as that shown in FIG. 6 for the CRS signal or in FIG. 8 for the BkRst signal.

Figure 9:
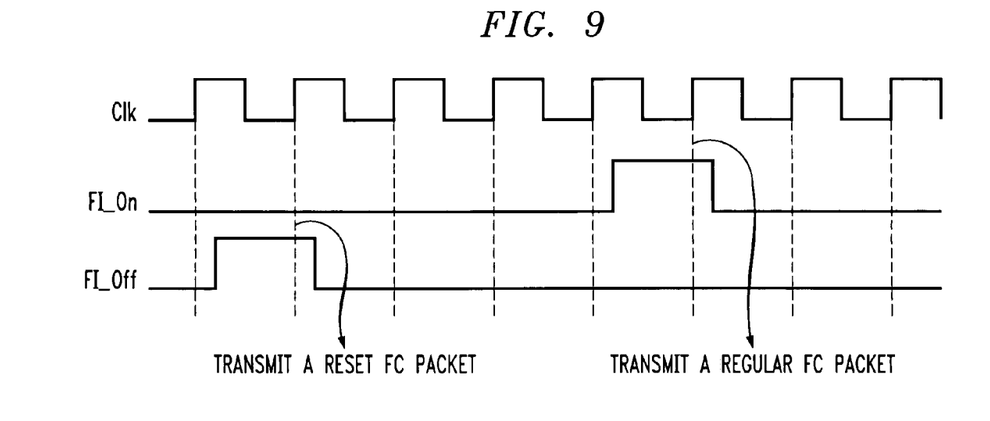
FIGS. 9, 13 and 14 are timing diagrams illustrating the operation of a split transmit and receive MAC interface in an illustrative embodiment of the invention.

The signals FI_On and FI_Off are used in the present embodiment to handle receive backpressure. FI_On indicates that a MAC transmit unit should insert a flow control packet with a time value from a time value register. Such a flow control packet is known as a "regular" flow control packet. FI_Off indicates that the MAC transmit unit should insert a reset flow control packet, that is, a flow control packet with a time value of '0001.' A timing diagram for the FI_On and FI_Off signals is shown in FIG. 9. The FI_On and FI_Off signals may be synchronized to the core clock in a manner similar to that described above with regard to the CRS signals, using synchronization circuits such as circuits 706 of FIG. 7. Address decoding for the FI_On and FI_Off signals can be implemented in substantially the same manner as that shown in FIG. 6 for the CRS signal or in FIG. 8 for the BkRst signal.

Figure 10:
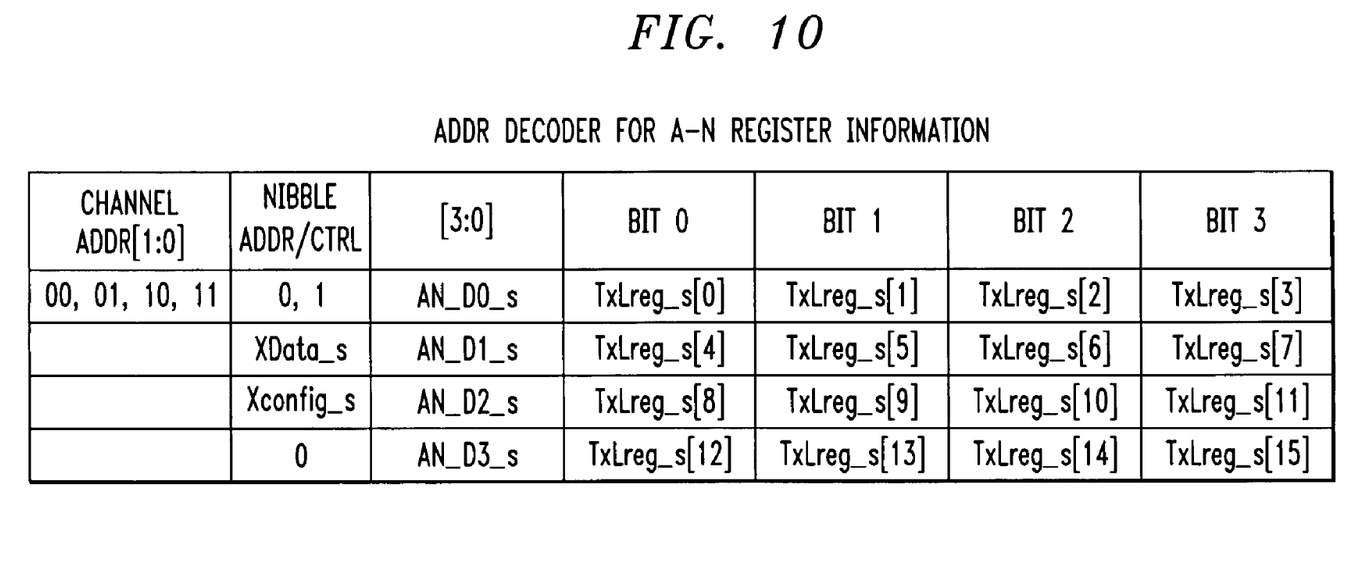

The AN_D signals for GE MACs operating in PMA are handled in the following manner. There are a total of 18 such signals, corresponding to signals denoted as XTxLinkReg [15:0], XmitData and XmitConfig. More specifically, AN_Dx_s denotes the sync signal of XTxLinkReg [15:0] and XData_s and XConfig_s denote sync signals of XmitData and XmitConfig, respectively. The table in FIG. 10 shows an exemplary address decoding for the AN_D signal for a particular GE MAC.

Figure 11:
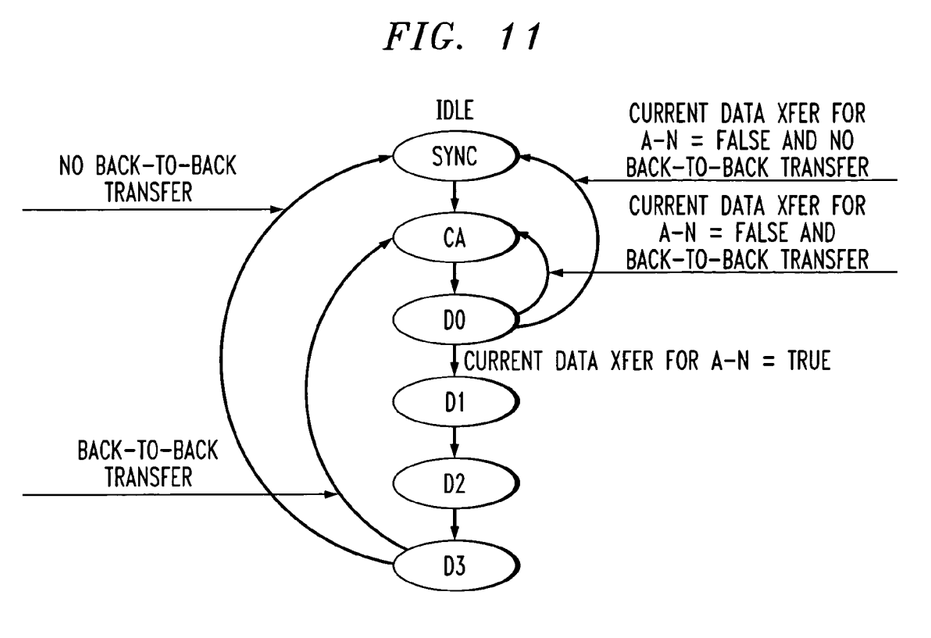
FIG. 11 shows one possible embodiment of a split transmit and receive MAC interface state machine.

Referring now to FIG. 11, an example of a split transmit and receive MAC interface state machine is shown. This state machine may be used in the state machine logic implemented in elements 404 and 518 of FIGS. 4 and 5, respectively. The states of the state machine in this embodiment include a SYNC state, a control address (CA) state, and four data states denoted D0, D1, D2 and D3. Five bits are used in conjunction with these states, corresponding generally to the bits of the IM_Data[0:4] or EM_Data[0:4] buses, as will be described in greater detail below. The uppermost three bits of the five bits are denoted herein as control information Ctrl[2:0].

The interface is in the SYNC state on power-up and during idle cycles. Any signal status change that occurs while the interface is in the SYNC state will cause a transition to the CA state. No information transfer occurs in the SYNC state. The SYNC state is used to synchronize the state machine at the transmit unit side with the state machine at the receive unit side. Whenever the state is not a SYNC state, a new valid state is being transferred from the receive unit side.

As indicated in the state machine diagram, return transitions from the data states D0 or D3 directly to the CA state may occur in the case of a back-to-back transfer. Absent such a back-to-back transfer, the return transitions from D0 and D3 are to the SYNC state.

Figure 12:
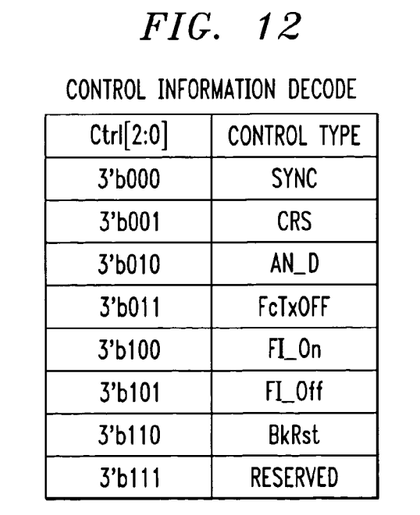
Figure 13:
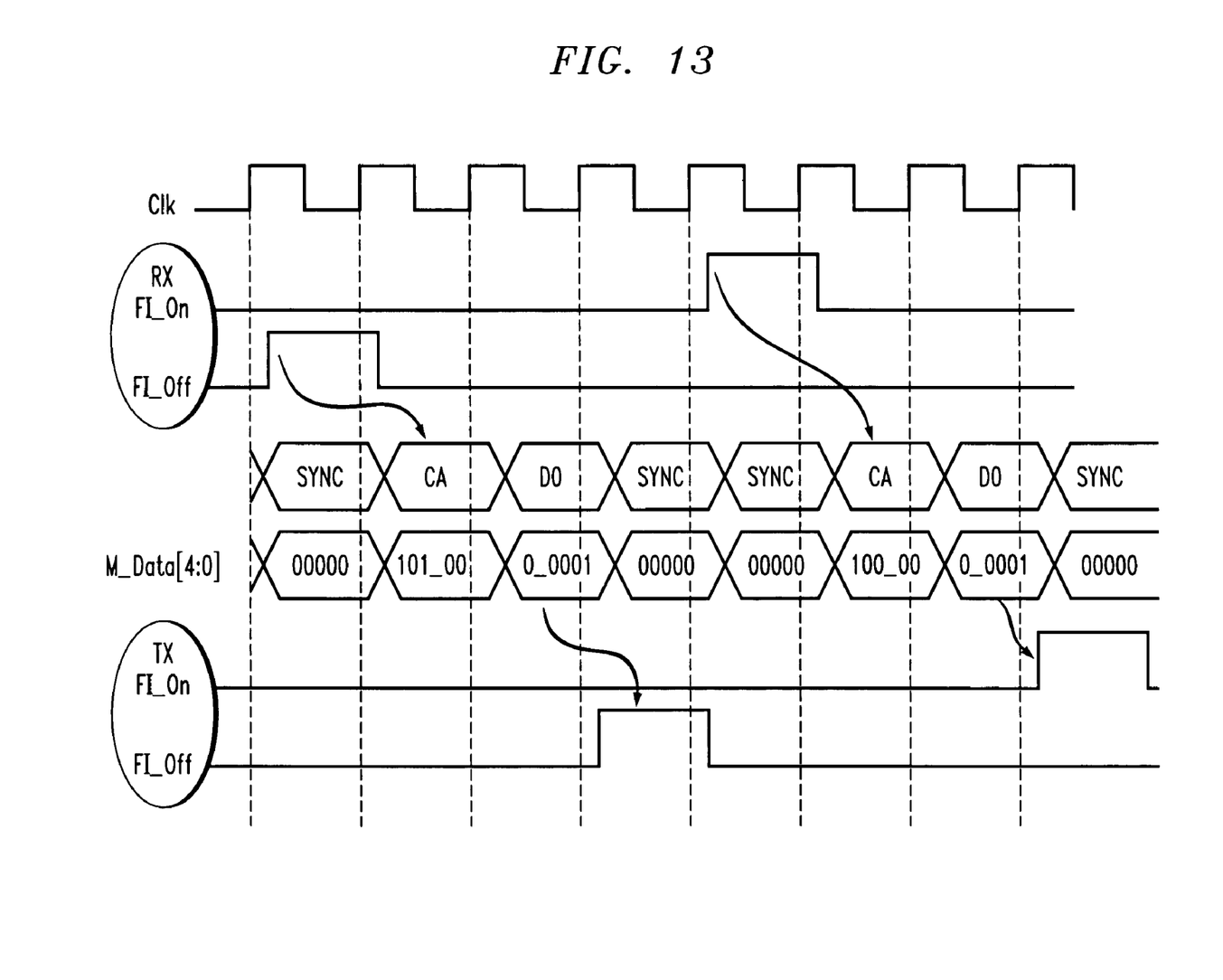
Figure 14:
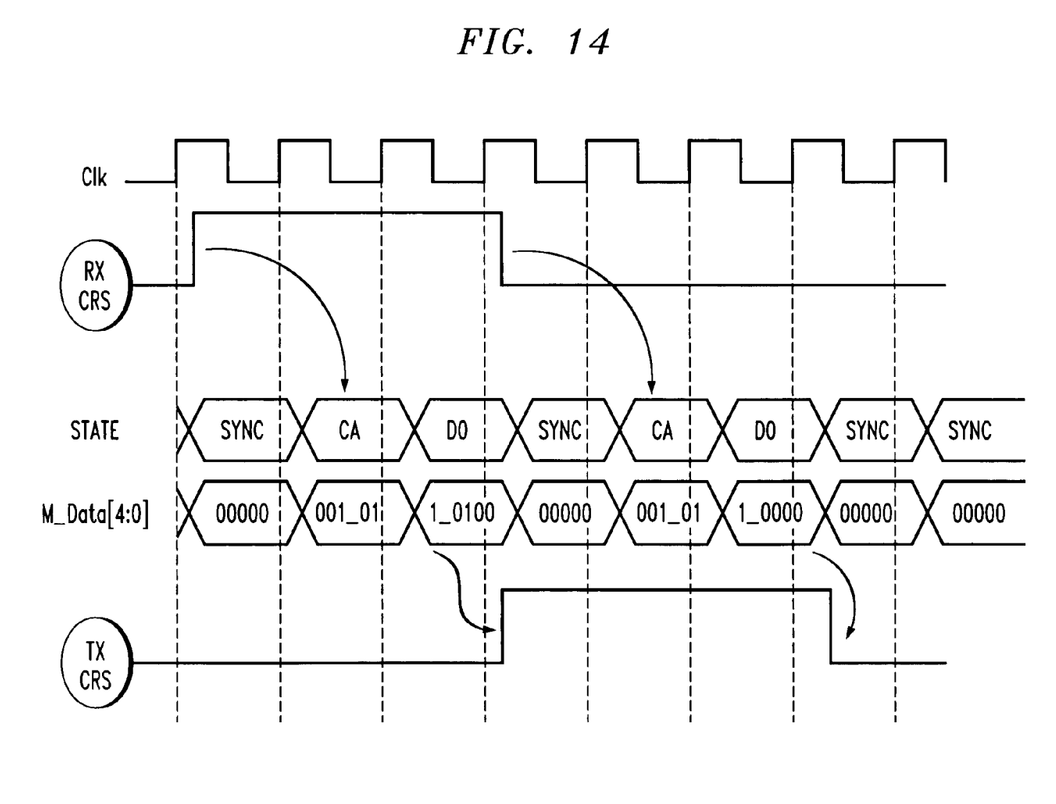

The table in FIG. 12 shows the decoding of control information associated with the SYNC and CA states. It can be seen that the control information '000' denotes the SYNC state, and the lower two of the five bits in this case should be driven to '00'.

The CA state carries information regarding control type, that is, information about the type of signal whose data has changed as indicated in the table of FIG. 12, as well as channel address for the signal that a MAC receive unit needs to transfer to its corresponding transmit unit. Out of the five bits noted previously, the upper three bits decode the control information, and the lower two bits decode the channel address. The reserved control type could be used, by way of example, for transferring pulse signal or window signal information from the receive unit side of the interface to the transmit unit side.

The data states D0, D1, D2 and D3 carry the data that is transferred from a MAC receive unit to its corresponding transmit unit in the illustrative embodiment. Only the AN_D control type utilizes all four data states. Thus, the state machine diagram of FIG. 11 shows that state D1 is entered from state D0 only if there is auto-negotiation present, as indicated by AN=true. In the absence of auto-negotiation, indicated in the diagram by AN=false, state D0 transitions to states CA or SYNC as previously described.

All other control types in the CA state utilize only a single data state. This single data state also carries the nibble address, if applicable, for decoding purposes. Out of the five bits for the single data state, the uppermost bit decodes the nibble address and the lower four bits carry the data. Thus, data state D0 always carries the nibble address information, while data states D1, D2 and D3 carry data for the AN_D control type only.

The core clock is the clock signal on which the IM_Data [4:0] bus signals are clocked. The IM_Data [4:0] bus carries control, address and data. More specifically, during the CA state, this bus will carry control and channel address information. During data state D0, the IM_Data [4:0] bus will carry a nibble address and four bits of data. During data states D1, D2 or D3, the IM_Data [4:0] bus will carry five bits of data.

Similarly, the EM_Clk clock denotes the clock signal on which the EM_Data [4:0] bus signals are clocked. The EM_Data [4:0] bus carries control, address and data. More specifically, during the CA state, this bus will carry control and channel address information. During data state D0, the EM_Data [4:0] bus will carry a nibble address and four bits of data. During data states D1, D2 or D3, the EM_Data [4:0] bus will carry five bits of data.

Pulse information to be transferred from a receive unit to a transmit unit includes the FI_On, FI_Off and BkRst signals described previously. These signals are asserted for a single clock pulse in their respective clock domains. For these signals, the interface is configured to transfer data only when the corresponding signal goes from high to low. The advantage of transferring only the high to low transition is that interface bandwidth is preserved and could be used for transferring other information.

Normally, the interface will start a new CA state as soon as it detects a change in one of its input signals so as to transfer the associated information. However, it behaves differently in the case of pulse information. Whenever the interface detects a pulse on a signal X, it just starts a new CA state as if X has become '1'. It will not send any information when X becomes '0'. The transferred information will be decoded and result in the generation of a pulse at the transmit side of the interface. This is illustrated in the timing diagram of FIG. 13, for an exemplary pulse transfer for Channel 0, Nibble Address 0 and Port 0. It should be noted that the latency between the change of status of a signal and the reflected new interface state can be more than one clock pulse. Pipelining techniques may be used to reduce this latency.

The CRS and FcTxOff signals are also referred to herein as "window" signals, in that they are valid for multiple clock periods on the receive unit side. For these two window signals, the interface will transfer any change in the status of these signals, that is, it will transfer data whenever these signals go from high to low or vice versa. Thus, whenever the interface detects a signal status change for a window signal X, it will transfer this information. The transferred information is decoded and results in the change of the status of signal X to an appropriate value. In this manner, any window signal status change on the receive unit side of the interface is duplicated on the transmit unit side. This is illustrated in the timing diagram of FIG. 14 for a CRS signal transferred over Channel 1, Nibble Address 1 and Port 6.

With regard to the transfer of AN_D information, the interface will generally transfer such information on any change in the status of AN_D signals. Since these signals in the illustrative embodiment are 18 bits wide, the interface will transfer 16 bits of data and two bits of control whenever any of these signals go from high to low or vice versa. So any AN_D signal status change on the receive unit side of the interface will be duplicated on the transmit unit side.

Figure 15:
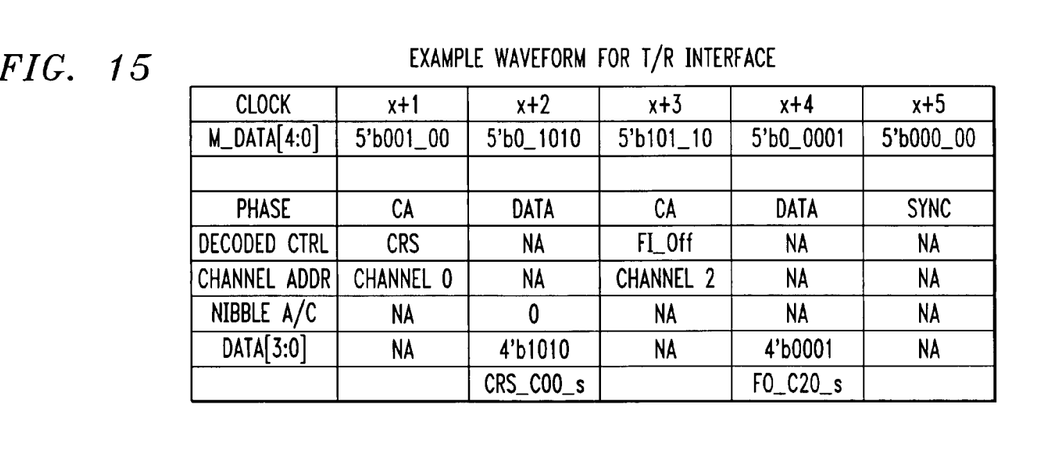
FIGS. 15 and 16 show examples of information transfer over a split transmit and receive MAC interface in accordance with the invention.
Figure 16:
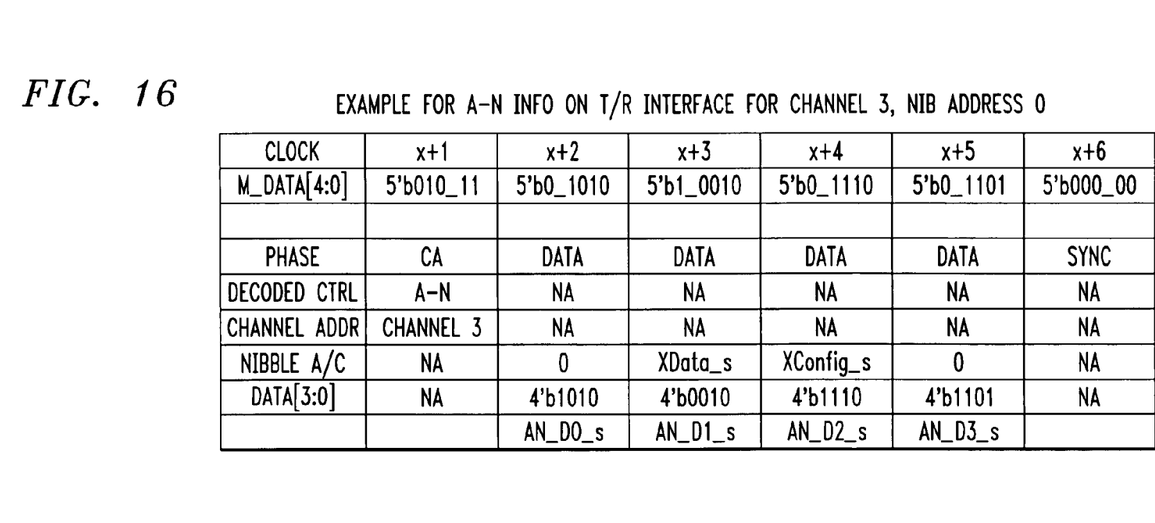

FIGS. 15 and 16 show examples of information transfer over a split transmit and receive MAC interface in accordance with the invention. FIG. 15 shows an example in which a CRS signal needs to be transferred on Channel 0, Nibble Address 0, Ports 0 and 2, and an FI_Off signal needs to be transferred on Channel 2, Nibble Address 0, Port 0. FIG. 16 shows an example in which an AN_D signal needs to be transferred on Channel 3, Nibble Address 0, Port 0. Of course, these are only examples, and numerous other types of information transfer may be accomplished over a split transmit and receive MAC interface configured utilizing the techniques of the invention.

Advantageously, the reduced complexity interface in the illustrative embodiment allows MAC receive and transmit units to be physically separated, on a single integrated circuit or across multiple integrated circuits, without requiring excessive use of routing lines, input-output circuits, or other chip resources. More specifically, the illustrative embodiment allows the receive and transmit units for multiple MACs to be placed on different integrated circuits using a low pin count interface comprising only five data signals and one clock signal.

It should again be emphasized that the above-described embodiments of the invention are intended to be illustrative only. Other embodiments can use different types and arrangements of processing elements for implementing the described functionality. For example, different arbitration mechanisms can be used to control multiplexing of signals from different MACs onto a common bus of the split transmit and receive interface. In addition, different arrangements of clock and information signals, and different types and combinations of MACs, may be used. More specifically, although an interface comprising a five-bit wide information signal bus and a single clock signal line is described above, other embodiments may use interfaces comprising other arrangements of information or clock signal buses, having larger or smaller bus widths. These and numerous other alternative embodiments within the scope of the following claims will be apparent to those skilled in the art.

What is claimed is:

1. A processor comprising:
   at least a portion of a first split transmit and receive media access controller;
   the split transmit and receive media access controller having a transmit unit and a receive unit physically separated from one another;
   wherein the processor comprises an interface for directing signals between the transmit unit and the receive unit of the first split transmit and receive media access controller, the interface being configured to multiplex the signals with signals directed between a transmit unit and a receive unit of at least a second split transmit and receive media access controller;
   wherein the first and second split transmit and receive media access controllers have respective distinct addresses encoded by particular values of information bits sent over the interface and the processor decodes said information bits so as to distinguish a first signal sent between the transmit and receive units of the first split transmit and receive media access controller from a second signal sent between the transmit and receive units of the second split transmit and receive media access controller.

2. The processor of claim 1 wherein one or more of the transmit units are implemented in a first region of an integrated circuit, and one or more of the receive units are implemented in a second region of the integrated circuit, remote from the first region.

3. The processor of claim 1 wherein one or more of the transmit units are implemented on a first integrated circuit and one or more of the receive units are implemented on a second integrated circuit.

4. The processor of claim 1 wherein the interface is controllably operable in one of at least two modes including an internal mode of operation, in which the interface is configured to deliver signals between one or more transmit units and one or more receive units where the transmit units and the receive units are implemented on the same integrated circuit, and an external mode of operation, in which the interface is configured to deliver signals between one or more transmit units and one or more receive units where the transmit units and the receive units are implemented on different integrated circuits.

5. The processor of claim 1 wherein the interface comprises a receive interface block coupled to a generate interface block via an interface bus, the generate interface block receiving signals from a plurality of media access controller receive units and multiplexing the signals onto the interface bus for delivery to the receive interface block, the receive interface block demultiplexing the signals from the interface bus for delivery to appropriates ones of a plurality of media access controller transmit units.

6. The processor of claim 5 wherein the generate interface block multiplexes the signals onto the interface bus utilizing a plurality of round-robin arbiters.

7. The processor of claim 5 wherein the interface bus comprises a five-bit wide information signal bus and at least one clock signal line.

8. The processor of claim 5 wherein the interface bus comprises a separate dedicated information signal bus for delivering carrier sense signals between one or more of the receive units and one or more of the transmit units in an internal mode of operation of the interface.

9. The processor of claim 5 wherein the signals received by the generate interface block for delivery to the receive interface block comprise one or more of carrier sense signals, auto-negotiation signals, flow control signals, and deference reset signals.

10. The processor of claim 5 wherein the signals received by the generate interface block are multiplexed onto the interface bus using a priority-based selection mechanism which assigns the highest priority to the carrier sense signals, the second highest priority to the auto-negotiation signals, and lower priorities to the flow control and deference reset signals.

11. The processor of claim 5 wherein the receive interface block and the generate interface block operate in accordance with a state machine having at least a synchronization state, a control address state and one or more data states.

12. The processor of claim 11 wherein the control address state carries information regarding signal type and signal interface address.

13. The processor of claim 1 wherein the interface comprises a plurality of channels, each having one or more ports associated therewith, and wherein a given signal to be directed between transmit and receive units of a given split transmit and receive media access controller is assigned to a particular channel and port of the interface.

14. The processor of claim 13 wherein each of the channels may have up to eight ports, with a single-bit nibble address being utilized to identify a particular one of first and second four-port groups of a given eight-port channel.

15. The processor of claim 1 wherein the processor comprises an integrated circuit.

16. The processor of claim 1 wherein the processor comprises a network processor.

17. A method for use in a processor comprising at least a portion of a first split transmit and receive media access controller, the split transmit and receive media access controller having a transmit unit and a receive unit physically separated from one another, the method comprising the step of:
  multiplexing onto a common interface (i) signals to be directed between the transmit unit and the receive unit of the first split transmit and receive media access controller, and (ii) signals to be directed between a transmit unit and a receive unit of at least a second split transmit and receive media access controller;
  wherein the multiplexing step further comprises the step of:
  associating the first and second split transmit and receive media access controllers with respective distinct addresses encoded by particular values of information bits sent over the interface;
  wherein said information bits are decoded so as to distinguish a first signal sent between the transmit and receive units of the first split transmit and receive media access controller from a second signal sent between the transmit and receive units of the second split transmit and receive media access controller.

18. A processor-readable storage medium for use in conjunction with a processor, the processor comprising at least a portion of a first split transmit and receive media access controller, the split transmit and receive media access controller having a transmit unit and a receive unit physically separated from one another, the medium having embodied therein processor-executable instructions, the instructions when executed implementing the step of:
  multiplexing onto a common interface (i) signals to be directed between the transmit unit and the receive unit of the first split transmit and receive media access controller, and (ii) signals to be directed between a transmit unit and a receive unit of at least a second split transmit and receive media access controller;
  wherein the multiplexing step further comprises the step of:
  associating the first and second split transmit and receive media access controllers with respective distinct addresses encoded by particular values of information bits sent over the interface;
  wherein said information bits are decoded so as to distinguish a first signal sent between the transmit and receive units of the first split transmit and receive media access controller from a second signal sent between the transmit and receive units of the second split transmit and receive media access controller.

19. An integrated circuit comprising:
  at least a portion of a first split transmit and receive media access controller;
  the split transmit and receive media access controller having a transmit unit and a receive unit physically separated from one another;
  wherein the integrated circuit comprises an interface for directing signals between the transmit unit and the receive unit of the first split transmit and receive media access controller, the interface being configured to multiplex the signals with signals directed between a transmit unit and a receive unit of at least a second split transmit and receive media access controller;
  wherein the first and second split transmit and receive media access controllers have respective distinct addresses encoded by particular values of information bits sent over the interface and said information bits are decoded in order to distinguish a first signal sent between the transmit and receive units of the first split transmit and receive media access controller from a second signal sent between the transmit and receive units of the second split transmit and receive media access controller.

20. The integrated circuit of claim 19 wherein one or more of the transmit units are implemented in a first region of the integrated circuit, and one or more of the receive units are implemented in a second region of the integrated circuit, remote from the first region.

21. The integrated circuit of claim 19 wherein one or more of the transmit units are implemented on the integrated circuit and one or more of the receive units are implemented on another integrated circuit.

22. The integrated circuit of claim 19 wherein one or more of the receive units are implemented on the integrated circuit and one or more of the transmit units are implemented on another integrated circuit.

* * * * *